July 2, 1963  D. B. BERGLUND ETAL  3,095,655
RANDOM SAMPLING DEMONSTRATION DEVICE
Original Filed Oct. 16, 1961
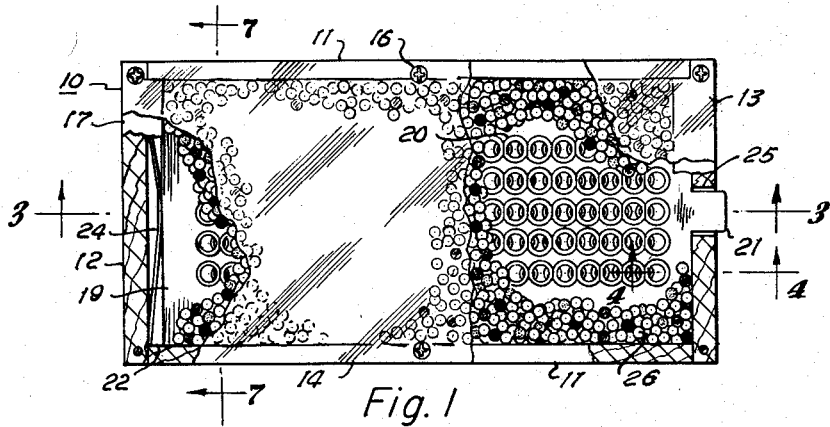
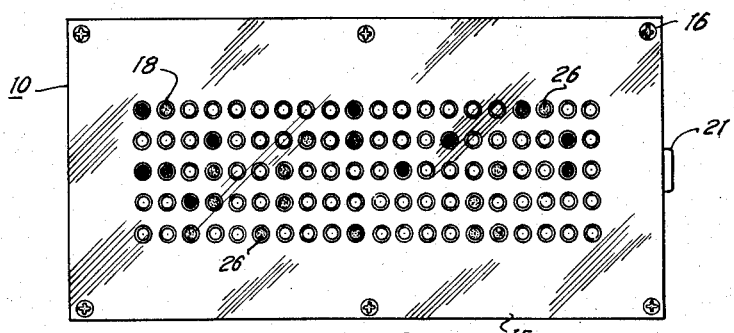
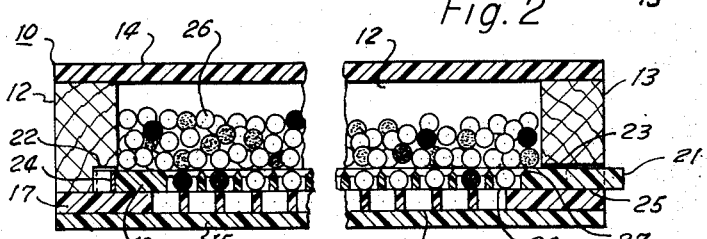
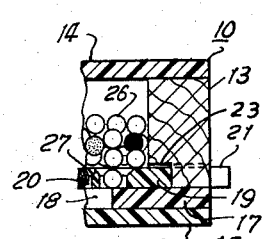
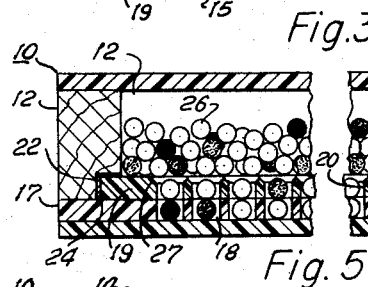
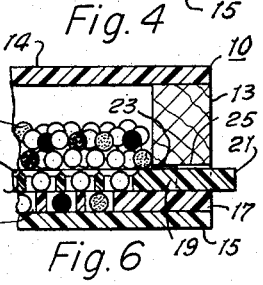
INVENTORS
David Bruce Berglund
John H. Drew
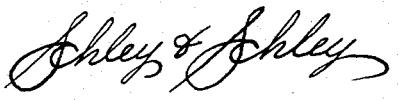
BY
ATTORNEYS

United States Patent Office 3,095,655
Patented July 2, 1963

3,095,655
RANDOM SAMPLING DEMONSTRATION DEVICE
David Bruce Berglund, Dallas, and John H. Drew, Arlington, Tex., assignors to Texas Electronic Products Corp., Dallas, Tex., a corporation of Texas
Continuation of application Ser. No. 145,292, Oct. 16, 1961. This application June 21, 1962, Ser. No. 207,141
8 Claims. (Cl. 35—30)

This invention relates to new and useful improvements in devices for demonstrating random sampling procedures.

As is well-known, many articles which are produced in very large quantities are inspected for defects by random sampling due to the prohibitive cost of inspecting each article. It is difficult, however, to determine the optimum number of articles which should be sampled since satisfactory results may be obtained by sampling fewer articles or a small increase may produce a much greater accuracy without sacrificing economy. Also, it is relatively expensive and time-consuming to ascertain the exact amount of decrease or increase required.

Accordingly, it is one object of the invention to provide an improved device for demonstrating random sampling procedures whereby the efficiency of a selected sampling plan can be readily determined and visibly displayed for study and instruction.

Another object of the invention is to provide an improved random sampling demonstrating device having a relatively large number of articles, such as beads, of different appearances and in various percentages, and means for isolating a small proportion of the articles to permit the quantity and distribution of the different articles to be analyzed.

A further object of the invention is to provide an improved device, of the character described, wherein a predetermined percentage of the articles are separated and held in a fixed position to permit observation and display of the quantity and distribution of the articles of one or more appearances relative to the other separated beads.

A construction designed to carry out the invention will be hereinafter described, together with other features of the invention.

The invention will be more readily understood from a reading of the following specification and by reference to the accompanying drawing, wherein an example of the invention is shown, and wherein:

FIG. 1 is a top plan view, with portions broken away, of a device constructed in accordance with the invention and showing the openings of its shutter and stationary plates misalined, FIG. 2 is a bottom plan view of the device showing beads confined in the openings of the stationary plate, FIG. 3 is a broken, transverse, vertical, sectional view, taken on the line 3—3 of FIG. 1, showing the openings of the stationary plate empty of beads, FIG. 4 is a view, similar to FIG. 3, taken on the line 4—4 of FIG. 1, showing the slidable confinement of one end of the shuttle plate, FIG. 5 is a view, similar to FIG. 3, showing the shuttle plate slid inwardly to aline its openings with the openings of the stationary plate and permit beads to engage in the latter openings, FIG. 6 is a view, similar to FIG. 3, showing the openings misalined and beads in the stationary plate openings, and FIG. 7 is a transverse, vertical, sectional view, taken on the line 7—7 of FIG. 1, showing beads in the stationary plate openings.

This application is a continuation of our copending application, Serial No. 145,292, filed October 16, 1961, now abandoned.

In the drawings, the numeral 10 designates the box-like container of a random sampling device which is rectangular and, preferably, of greater length than width. The container includes a pair of longitudinal, marginal frame members or side walls 11 and transverse, marginal frame members or end walls 12 and 13, of wood or other siutable material, having their end portions suitably connected and coacting to provide a frame for said container. Rectangular, transparent top and bottom panels or walls 14 and 15, of plastics or other suitable material, overlie the frame members 11, 12 and 13, which are rectangular in cross-section, and are secured thereto by screws 16 so as to complete the exterior of the container 10 and permit observation of its contents. A complementary, flat plate 17, of opaque plastics or other suitable material, is interposed between the bottom panel 15 and frame members and is secured thereto by the screws 16. The plate 17 has a plurality of circular openings 18 extending therethrough and arranged in parallel, transverse and longitudinal rows so as to substantially cover the area of said plate within the confines of the frame members 11, 12 and 13. This exact arrangement is subject to variation, particularly, when when the container is of a configuration other than rectangular. As shown in FIG. 2, the openings 18 of each row are equally spaced, however, the openings of the transverse rows may be spaced a greater distance apart than the openings of the longitudinal rows.

A rectangular, flat shuttle member or plate 19 overlies the plate 17, which is stationary, and has a plurality of openings 20 complementary to the openings 18 for alinement therewith. The shuttle plate 19 is of less length and width than the plate 17, being of a length greater than the distance between the transverse frame members 12 and 13 (FIGS. 3–6) and of a width substantially equal to the distance between the longitudinal frame members 11 (FIG. 7). For slidably supporting the shuttle plate, which has a reduced extension or tab 21 projecting from one end thereof, channels or grooves 22 and 23 are formed in the inner surfaces of the frame members 12 and 13, respectively, at the lower margins thereof and immediately above the stationary plate. A leaf spring 24 is disposed in the groove 22 of the member 12 for engaging the adjacent end of the shuttle plate and urging its opposite end into engagement with the bottom of the groove 23 of the member 13, as shown most clearly in FIG. 4, whereby the tab 21 of said plate projects through and beyond a complementary opening or slot 25 in said member 13 communicating with said groove 23 and whereby the openings 18 and 20 are misalined. When the tab is depressed, the shuttle plate is slid inwardly toward the member 12 to aline the openings of the plates. It is noted that the inward and outward movement of the shuttle plate 19 is insufficient to disengage the same from the grooves 22 and 23.

A large number of beads, balls or other spherical articles 26, of a diameter slightly less than the openings 18 and 20 of the stationary and shuttle plates 17 and 19, are disposed within the container 10 between said shuttle plate and the top panel 14 for passage through said openings 20 into said openings 18. The beads 26, which are of different colors or appearances, are adapted to be thoroughly mixed by inverting and shaking the container. When the container is returned to its normal position, one of the beads drops into each opening 20 and falls into the underlying alined opening 18 upon inward reciprocation of the shuttle plate by depressing of the tab 21 (FIG. 5). Upon release of the tab, the spring 24 slides the shuttle plate outwardly to misaline the openings and confine or trap the beads in the openings 18 (FIGS. 6 and 7). Due to the transparency of the bottom panel 15, the trapped beads may be readily observed. In order to ensure filling of all of the shuttle plate openings 20 with beads, the upper ends of said openings are enlarged by bevelling or chamfering 27. Also, the depth of the openings 18 is substantially equal to the diameter thereof so that only one bead can enter each opening and binding of the shuttle plate is prevented. Preferably, the openings 20 are of substantially the same depth as the openings 18 and are of the same number.

This number is a predetermined percentage of the number of beads 26, such as 10%, and may be one hundred as compared to one thousand beads. Although these numbers are subject to variation, the same number of beads are adapted to be trapped upon each actuation of the shuttle plate. The beads are of different appearances or colors so as to represent various percentages of defective or faulty articles which are acceptable to the producer or consumer. For example, ½ of 1% of the beads may be green, 1% purple, 2% red, 3% orange, 4% yellow, 10% blue, and the remaining 79½% white, so as to allow the assignment of permissible defectives from ½ of 1% to 20½% in increments of ½ of 1%. The percentages of different colors permit selected plans of random sampling to be studied by analyzing the quantity and distribution of the trapped beads. If it is desired to study a random sampling plan wherein 4% of the articles may be defective, the yellow beads or the orange and purple beads are considered and the other beads are ignored. From a series of study, the most efficient sampling procedure can be readily determined and demonstrated. Due to the transparency of the bottom panel 15 and the trapping of the beads, the arrangement and the relative number of the beads may be displayed to others for instruction purposes. Preferably, the stationary plate 17 is opaque so as to shield the beads thereabove when the beads in the openings 18 of said plate are being observed.

The foregoing description of the invention is explanatory thereof and various changes in the size, shape and materials, as well as in the details of the illustrated construction may be made, within the scope of the appended claims, without departing from the spirit of the invention.

What we claim and desire to secure by Letters Patent is:

1. A random sampling demonstrating device including a container having an upright marginal wall, a top wall overlying the marginal wall, plate means underlying the marginal walls and having a plurality of openings therein, a shuttle member slidably mounted in the container in overlying relation to the plate means and having a plurality of openings for alinement and misalinement with the openings of said plate means upon reciprocation of the member, and a plurality of spherical articles of slightly less diameter and of greater quantity than the openings for passage through the shuttle member openings and confinement in said plate means openings upon alinement and misalinement of said openings, a percentage of the articles having a different appearance so as to be distinguishable from the articles, the articles confined in said plate means openings being visible through the lower ends of said openings.

2. A random sampling demonstrating device as set forth in claim 1 including means for preventing the articles in the openings of the plate means from escaping through the lower ends of said openings without obstructing observation of said articles.

3. A random sampling demonstrating device as set forth in claim 1 including bottom wall means underlying the plate means for preventing the articles confined in the openings of said plate means from escaping through the lower ends of said openings, the bottom wall means being of such structure as to permit observation of said confined articles.

4. A random sampling demonstrating device as set forth in claim 3 wherein the bottom wall means includes a panel of transparent material.

5. A random sampling demonstrating device as set forth in claim 1 wherein the openings of the plate means are of a depth substantially equal to the diameter of the spherical articles so that only one of said articles can be confined in each opening at a time.

6. A random sampling demonstrating device as set forth in claim 1 including means projecting through the marginal wall of the container to permit manual reciprocation of the shuttle member in one direction for alining the openings thereof with the openings of the plate means, and means for urging said shuttle member in the opposite direction to misaline said openings.

7. A random sampling demonstrating device as set forth in claim 1 wherein the plate means is of a thickness substantially equal to the diameter of the spherical articles so that only one of said articles can be confined in each of said openings at one time.

8. A random sampling demonstrating device as set forth in claim 1 wherein the spherical articles are of different colors in various percentages.

References Cited in the file of this patent

UNITED STATES PATENTS

| | | |
|---|---|---|
| 1,722,986 | McAlice | July 30, 1929 |
| 1,766,521 | Klink | June 24, 1930 |
| 3,074,718 | Modica | Jan. 22, 1963 |